(12) United States Patent
Lin et al.

(10) Patent No.: US 7,715,657 B2
(45) Date of Patent: May 11, 2010

(54) METHOD, DEVICE AND PROGRAM FOR DETECTING PERCEPTUAL FEATURES OF A LARGER IMAGE AND INCORPORATING INFORMATION OF THE DETECTED PERCEPTUAL FEATURES INTO A SMALLER PREVIEW IMAGE

(75) Inventors: Zhouchen Lin, Beijing (CN); Liang Wan, Hong Kong (CN); Wei Feng, Hong Kong (CN); Tien-Tsin Wong, Hong Kong (CN); Zhi-Qiang Liu, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 11/276,196

(22) Filed: Feb. 17, 2006

(65) Prior Publication Data

US 2007/0196027 A1    Aug. 23, 2007

(51) Int. Cl.
G06K 9/32 (2006.01)
G06K 9/36 (2006.01)
G06K 9/40 (2006.01)
G06F 3/048 (2006.01)

(52) U.S. Cl. ............... 382/298; 382/100; 382/254; 382/261; 382/276; 715/838

(58) Field of Classification Search .............. 382/261, 382/100, 254, 276, 298, 299, 301; 715/273, 715/835, 838
See application file for complete search history.

(56) References Cited

U.S. PATENT DOCUMENTS 5,641,596 A * 6/1997 Gray et al. ................. 430/21
6,181,834 B1 * 1/2001 Li et al. ..................... 382/298
6,404,901 B1 * 6/2002 Itokawa ..................... 382/103
6,548,800 B2 * 4/2003 Chen et al. ............... 250/208.1
2003/0026495 A1 * 2/2003 Gondek et al. .............. 382/261
2004/0205629 A1 * 10/2004 Rosenholtz et al. ......... 715/526

FOREIGN PATENT DOCUMENTS

WO    WO0207013 A2    1/2002

OTHER PUBLICATIONS

Chmielewski, et al., "A Distrubuted Platform from Archiving and Retrieving RSS Feeds", IEEE, 2005, Proc 4th Annual ACIS Intl Conf on Computer and Information Science, 6 pgs.
PCT Written Opinion of the Intl Searching Authority for Application No. PCT/US2007/004834, dated Aug. 7, 2007, 6 pgs.
Sutter, et al., "Enchancing RSS Feeds: Eliminating Overhead Through Binary Encoding", IEEE, 2005, Proc 3rd Intl Conf on Information Technology and Applications, 6 pgs.

* cited by examiner

*Primary Examiner*—Tom Y Lu
*Assistant Examiner*—Thomas A Conway
(74) *Attorney, Agent, or Firm*—Lee & Hayes, PLLC (57) ABSTRACT

Systems and methods for perceptual image preview are described. In one aspect, a naïve preview image is generated by downsampling a larger image. Perceptual features of the larger image are then detected. Information associated with the detected perceptual features is then incorporated into the naïve preview image to create a perceptual preview image. Since the perceptual preview image incorporates information associated with the detected perceptual features, a viewer of the perceptual preview image will be more likely to detect the presence or absence of such perceptual features in the larger image.

20 Claims, 4 Drawing Sheets

METHOD, DEVICE AND PROGRAM FOR DETECTING PERCEPTUAL FEATURES OF A LARGER IMAGE AND INCORPORATING INFORMATION OF THE DETECTED PERCEPTUAL FEATURES INTO A SMALLER PREVIEW IMAGE

BACKGROUND

A preview image typically represents a reduced or downsampled version of a larger image. Imaging applications typically present an image preview on a display device for a viewer to approximate image composition, quality, and/or other aspects of the larger image from which the preview image was derived. However, because preview images are the results of downsampling operations, preview images are created with only a subset of the information present in the corresponding larger images. As a result, a user may not be able to ascertain significant perceptual features that are present in the larger image (e.g., noise, blur, depth of field, white balance, bloom effects, etc.) merely by viewing the preview image. In such scenarios, preview images may not adequately address a user's image previewing and browsing needs.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, systems and methods for perceptual image preview are described. In one aspect, a naïve preview image is generated by downsampling a larger image. Perceptual features of the larger image are then detected. Information associated with the detected perceptual features is then incorporated into the naïve preview image to create a perceptual preview image. Since the perceptual preview image incorporates information associated with the detected perceptual features, a viewer of the perceptual preview image will easily detect the presence or absence of such perceptual features in the larger image.

BRIEF DESCRIPTION OF THE DRAWINGS

In the Figures, the left-most digit of a component reference number identifies the particular Figure in which the component first appears.

DETAILED DESCRIPTION

An Exemplary System

Although not required, the systems and methods for perceptual image preview are described in the general context of computer-executable instructions (program modules) being executed by a computing device such as a personal computer. Program modules generally include routines, programs, objects, components, data structures, etc., that perform particular tasks or implement particular abstract data types while the systems and methods are described in the foregoing context, acts and operations described hereinafter may also be implemented in hardware.

Figure 1:
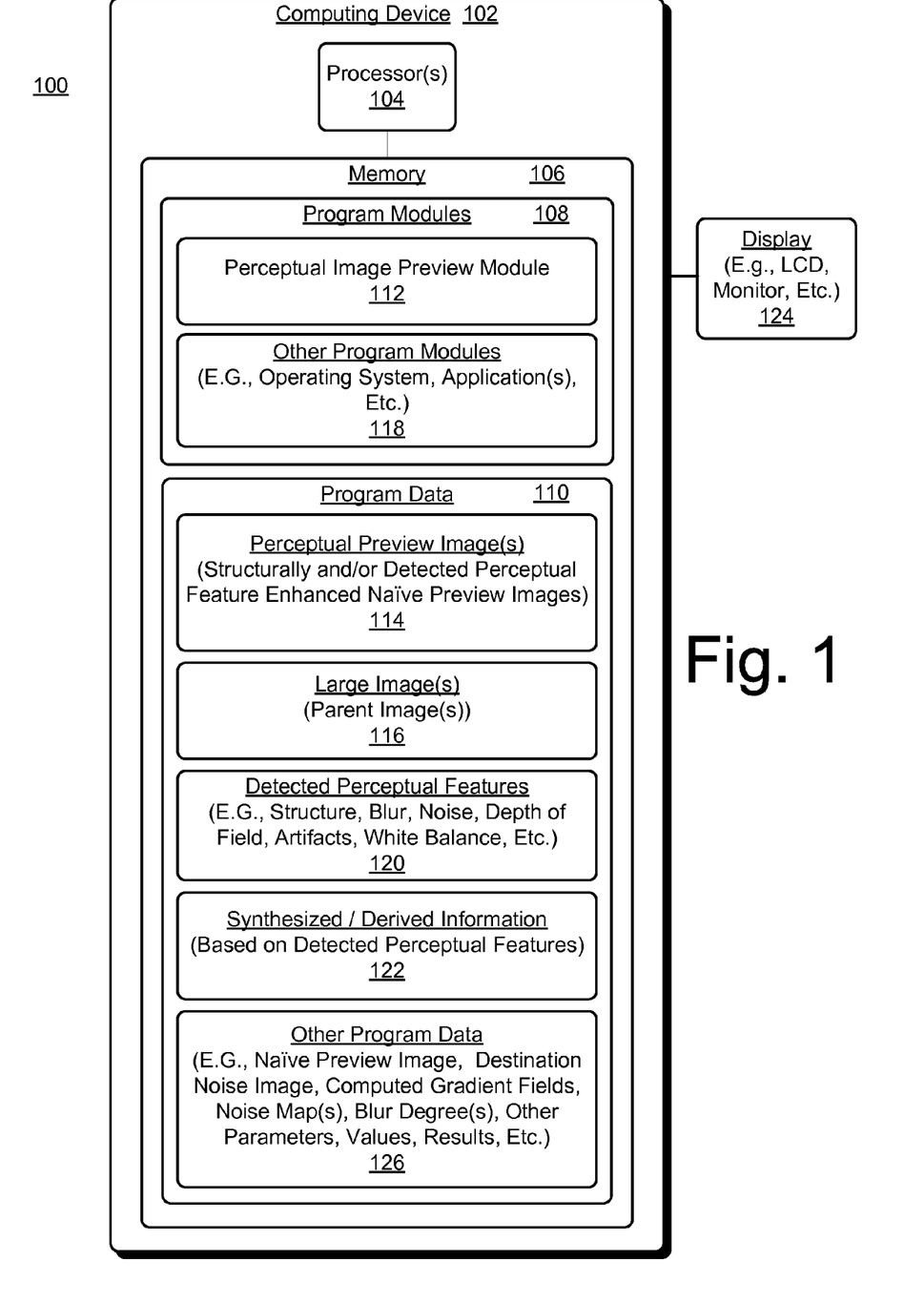
FIG. 1 illustrates an exemplary system for perceptual image preview, according to one embodiment.

FIG. 1 shows an exemplary system 100 for perceptual image preview, according to one embodiment. System 100 includes host computing device 102. Host computing device 102 represents any type of computing device such as a small form factor device, a digital camera, a handheld or mobile computing device, a laptop, a personal computer, a server, etc. Host computing device 102 includes one or more processing units 104 coupled to memory 106. Memory 106 includes system memory and any other type of memory coupled to computing device 102 such as compact flash memory, etc. System memory (e.g., RAM and ROM) includes computer-program modules ("program modules") 108 and program data 110. Processor(s) 104 fetch and execute computer-program instructions from respective ones of the program modules 108. Program modules 108 include perceptual image preview module 112 for generating a perceptual preview image 114 from a larger (parent) image 116. Program modules 108 also includes "other program modules" 118 such as an operating system, application(s) that leverage aspects of perceptual image preview module 112 (e.g., present perceptual preview images 114 to user, etc.), and/or so on.

Perceptual image preview module 112 ("preview module 112") downsamples a larger image 116 to create a conventional naïve preview image. Preview module 112 then enhances this naïve preview image with additional information associated with the larger image 116 to better show one or more of structure and or perceptual features of the larger image 116. This enhanced naïve preview image is a perceptual preview image 114. More particularly, to generate the perceptual preview image 114, preview module 112 detects and evaluates structure and arbitrary perceptual features (e.g., one or more of noise, blur, depth of field, blooming, white balance, and/or so on) from the larger image 116. Such detected structure and arbitrary perceptual features are shown as respective portions of detected perceptual features 120. Preview module 112 enhances the naïve preview image with information associated with one or more of these detected aspects to allow a viewer to more accurately ascertain the existence or absence of these aspects in the larger image 116.

These and other aspects of the systems and methods for perceptual image preview are now discussed in greater detail.

Exemplary Structure Enhancement

Preview module 112 augments a naïve preview image of a larger image 116 with structural enhancements to structurally enhanced preview image 114. These augmentation operations strengthen salient edges and flatten weak details in the resulting image. Since salient edges often separate different objects, this approach typically increases the inter-object contrast and reduces intra-object contrast. As a result, image structure becomes more visually apparent and attractive to a users' attention. The more apparent structure enables a user to more readily detect any information associated with other detected perceptual features 120 that are subsequently incorporated into a structurally enhanced perceptual preview image 114.

In this implementation, preview module 112 implements structure enhancement via non-linear modulation in the image gradient domain. Because salient edges in spatial domain have large gradient magnitudes, while weak details correspond to small gradient magnitudes, the problem becomes to increase the large gradients and reduce the small gradients. The increase of large gradients strengthens the important edges, and the reduction of small gradients suppresses the redundant details. By solving a Poisson equation, the image can be reconstructed given the gradient field and the image boundary. The adjustment in the gradient field is thus reflected in the resultant image.

In this implementation, preview module 112 creates a structurally enhanced perceptual preview image 114 by first converting the generated naïve preview image to YUV color space. Preview module 112 then computes the gradient field for the luminance component. The chrominance components are kept intact to guarantee that the image color will not change. A modified sigmoid function is used to modulate the gradient magnitudes:

$$G'_i = \frac{\alpha}{1 + \exp(-k(G_i - \beta))}, \quad (1)$$

where $G_i$ is the gradient magnitude for pixel i and $G'_i$ is the adjusted gradient magnitude. The gradient direction is not changed since local direction adjustment may destroy the consistency of gradient field. Parameter $\alpha$ controls the maximum adjustment magnitude. When $\alpha$ is set to a value smaller than 1, all the gradients will be suppressed. Parameter k controls the modulation slope. The larger k, the more large gradient magnitudes are magnified, and the more small gradient magnitudes are suppressed. Parameter $\beta$ defines the threshold to differentiate large and small gradient magnitudes. Parameter $\beta$ has a larger impact on the result than parameters $\alpha$ and k do. To preserve locally salient tiny details, $\beta$ is chosen adaptively as follows:

$$\beta = \begin{cases} \beta_l, & \text{for } \beta_l < \beta_g, \\ \beta_g, & \text{otherwise,} \end{cases} \quad (2)$$

where $\beta_g$ is a global threshold, and $\beta_l$ is a local threshold. $\beta_l$ is evaluated as the average gradient magnitudes in the neighborhood of the pixel, weighted by a Gaussian. $\beta_g$ is evaluated in the same way on the whole image. Equation (2) respects strong edges and favors weak yet salient edges.

Figure 2:
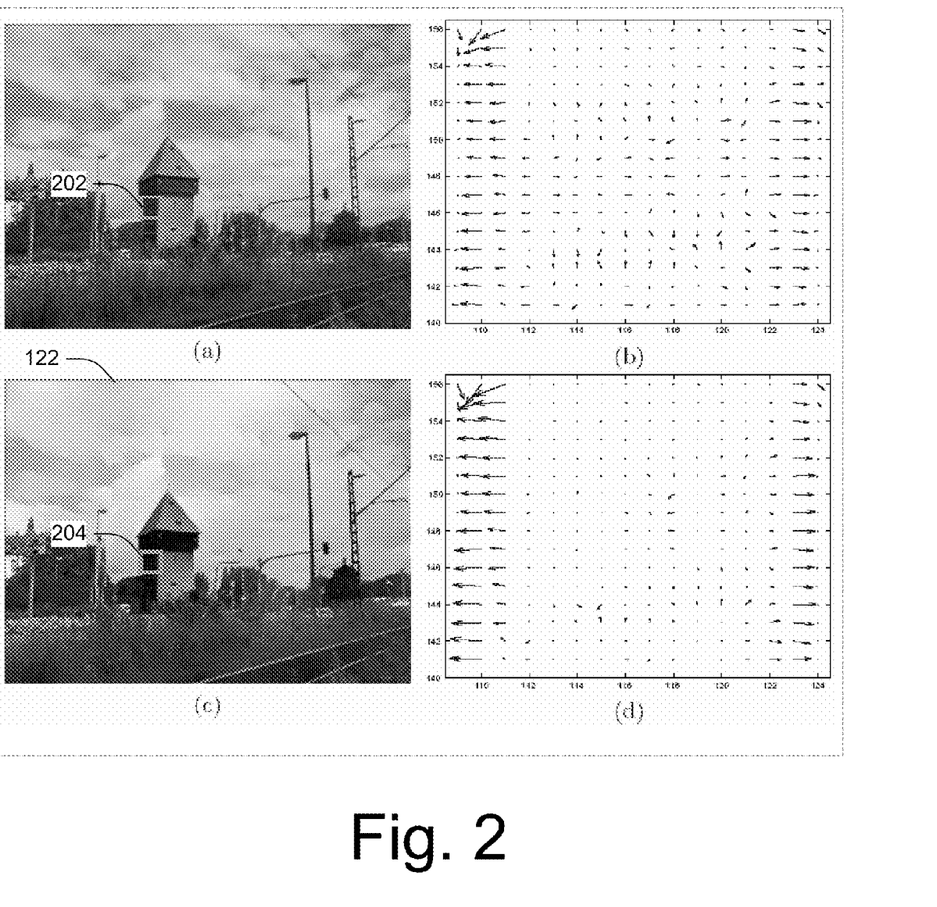
FIG. 2(a) illustrates an exemplary arbitrary naïve preview image.
FIG. 2(b) shows an exemplary gradient field inside a region of arbitrary naïve preview image of FIG. 2(a).
FIG. 2(c) shows exemplary arbitrary structurally enhanced perceptual preview image generated from the arbitrary naïve preview image of FIG. 2(a).
FIG. 2(d) shows an exemplary gradient field inside a region of the arbitrary structurally enhanced perceptual preview image of FIG. 2(c).

FIG. 2(a) illustrates an exemplary arbitrary naïve preview image, according to one embodiment. FIG. 2(b) shows an exemplary gradient field inside the region of the arbitrary naïve preview image shown in FIG. 2(a). The region is indicated by box 202 positioned on the tower. FIG. 2(c) shows exemplary arbitrary structurally enhanced perceptual preview image 114 (FIG. 1) generated from the naïve preview image of FIG. 2(a), according to one embodiment. FIG. 2(d) shows an exemplary gradient field inside the box 204 of FIG. 2(c), according to the one embodiment. In FIG. 2(d), the gradient directions are kept unchanged as compared to the gradient directions in FIG. 2(b), while the gradient magnitudes are increased for the large gradients and reduced for the small gradients (as compared to the gradient magnitudes of FIG. 2(b)). The structurally enhanced perceptual preview image of FIG. 2(c) presents a clearer image structure as compared to the naïve preview image of FIG. 2(a).

Exemplary Perceptual Feature Preservation

There are many arbitrary types of perceptual features that may be detected from an image 116. Such perceptual features include, for example, white balance, depth of field, blooming, blocky artifacts caused by image compression, image quality, etc. (Blooming is the affect that a dynamic range pixel is overexposed so that the neighboring pixels are brightened and overexposed). To present perceptual features exhibited by a larger image 116 in a perceptual preview image 114, preview module 112 detects such perceptual features (i.e., shown as detected perceptual features 120) from the larger image 116. The number and types of perceptual features represented by detected perceptual features 120 are arbitrary and a function a particular implementation.

Next, preview module 112 incorporates information (e.g., synthesized/derived information 122) associated with at least a subset of the detected perceptual features 120 into a naïve preview image or a structurally enhanced perceptual preview image 114. When the information is incorporated into a naïve preview image, a new perceptual preview image 114 results. Although the incorporated information can be information that was extracted from the larger image 116, the incorporated information is not necessarily extracted information. Rather, in some or all instances, such information is synthesized or derived from the information provided by the detected perceptual features 120. In view of this, and in this implementation, exact accuracy of detecting perceptual features 120 exhibited by the apparent image 116 is not necessary. Inclusion of information corresponding to the detected perceptual features 100 into the perceptual preview image 114 allows the perceptual preview image 114 to convey more information to a viewer about the larger parent image 116. For instance, by showing that the detected perceptual features exist to some degree in the parent image 116.

Noise

Noise is often introduced into an image 116 when the image is captured using a high ISO mode (e.g. ISO 400 or greater), or when a short exposure is used to capture the image. Noise typically appears like color grains that are distributed across the image. Noise usually appears in dark regions. It is assumed that noise has an additive property and complies with uniform distribution. Though this assumption does not always hold if considering various noise generation schemes, it is sufficient for reflecting noise on a structurally enhanced perceptual preview image 114.

To represent noise present in a larger image 116 in a corresponding perceptual preview image 114, preview module 112 detects and stores the noise from the parent image 116 as source noise image using any of multiple well-known noise detection techniques. Based on the assumption of uniform distribution, preview module 112 generates a destination noise image (with dimensions equivalent to the structurally enhanced preview perceptual preview image 114) by randomly sampling from the source noise image. Such source and destination noise images are shown as respective portions of "other program data" 126 (FIG. 1). The destination noise image is added to the structure enhanced preview image to represent the noise of the larger parent image 116. In another implementation, the destination noise image is added to the naïve preview image, rather than the structurally enhanced perceptual preview image 114.

In one implementation, noise is not detected from a large image 116, but rather only from a uniform smaller region of the larger image 116, for example, from a region that includes few salient edges. The objective is to present noise in the resulting perceptual preview image 114 that looks similar to that one that would be viewed on the larger image 116. It is unnecessary to extract noise from the whole original image 116. For instance, suppose the uniform region Ω is expected to have a size of M×M pixels, where M is of a mild value, say 10d, in which d is the rate of size reduction. Too large M will make the desired uniform region non-existent. Too small M will not provide accurate enough noise.

In one implementation, instead of detecting Ω in the larger image 116 directly, preview module 112 searches a corresponding region $\Omega_d$ of size (M/d)×(M/d) pixels in the naïve preview image, then maps it to Ω of the original image 116. The naïve preview image will exhibit less noise than present in the larger image from which it was derived. Additionally, because the naïve preview image has a much smaller dimension, the search for $\Omega_d$ is efficient and reliable. More specifically, preview module 112 divides the naïve preview image into non-overlapped blocks, and selects the block $\Omega_d$ that has the smallest variance. In most cases, the region Ω that corresponds to $\Omega_d$ contains no salient edges. Therefore, its high frequency components compose the noise map $N_s$. Preview module 112 applies discrete stationary wavelet transform to reliably estimate noise $N_s$. Because the region size is quite small, the computation is very fast.

Figure 4:
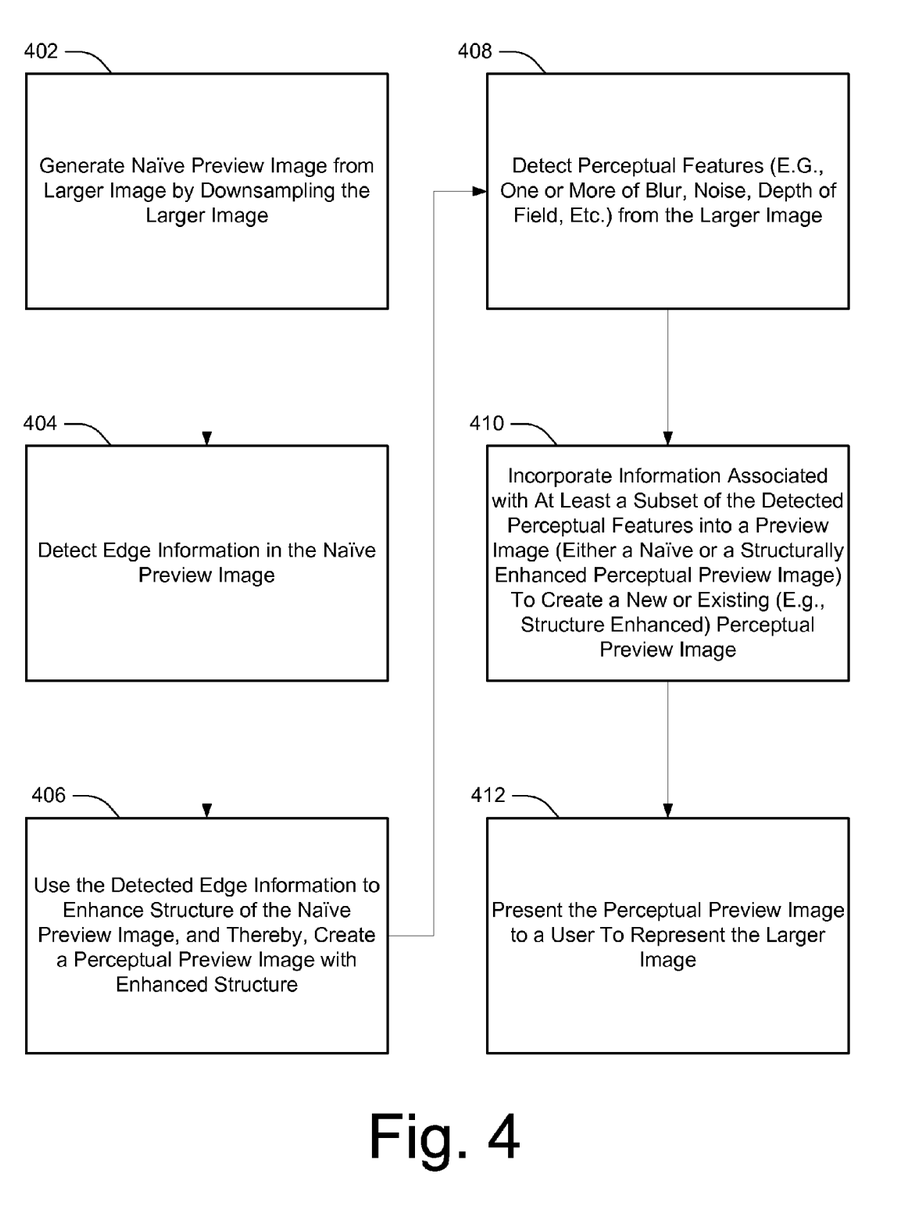
FIG. 4 shows an exemplary procedure for perceptual image preview, according to one embodiment.

In one implementation, to produce the noise map $N_d$ with the reduced dimension, preview module 112 utilizes texture synthesis methods to keep the noise spatial distribution in $N_s$. In practice, preview module 112 randomly generates a noise map $N_d$ from $N_s$ based on the assumption that noise has a uniform distribution. Though $N_d$ does not exactly match the noise distribution in the original image 116, $N_d$ conveys users a similar visual experience as the original one (see FIG. 4, which is described below). To improve algorithm stability, preview module 112 chooses K uniform regions and randomly samples in all regions. In this implementation, M=80, and K=5. The final image $I_f$ is computed as follows, $$I_f = I_d + \gamma \cdot N_d,$$

where $I_d$ is the reduced image, and γ is a parameter to control how salient the noise need to be visualized.

Figure 3:
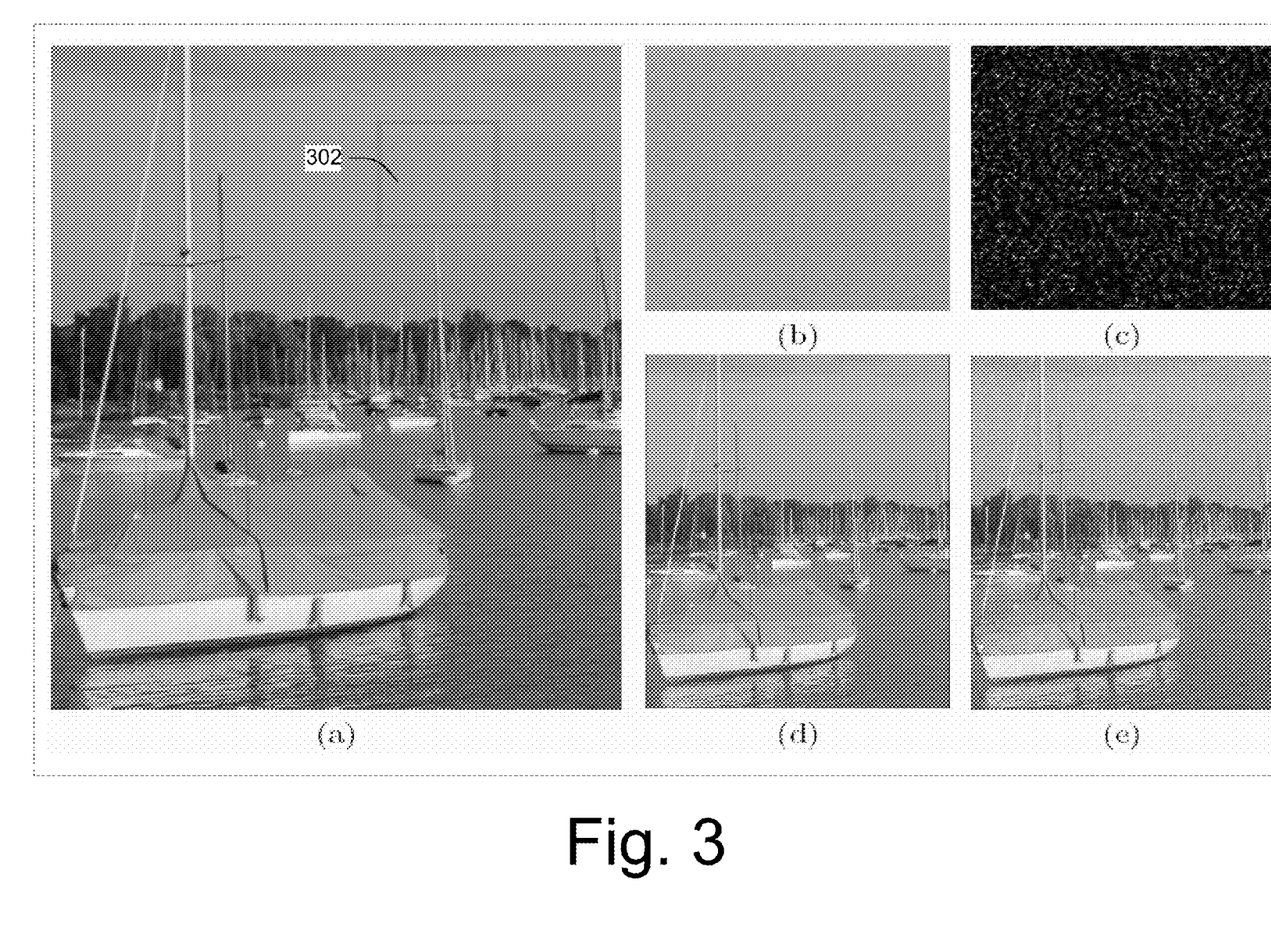
FIGS. 3(a) through 3(e) illustrate various aspects of exemplary noise preservation for synthesized incorporation into a preview image to generate a perceptual preview image, according to one embodiment.

FIG. 3 illustrates exemplary noise preservation for incorporation into a perceptual preview image 114, according to one embodiment. FIG. 3(a) shows an original image 116 from which a perceptual preview image 114 is to be generated, according to one embodiment. FIG. 3(b) shows the visible noise of box 302 of FIG. 3(a) for better visual inspection of the exhibited noise. FIG. 3(c) shows an exemplary detected noise map generated from the noise shown in FIG. 3(b). FIG. 3(d) shows an exemplary naïve preview image of the larger image in FIG. 3(a). Please note that FIG. 3(d) does not exhibit any noise is present in the original image of FIG. 3(a). FIG. 3(e) shows a perceptual image preview image 114 that more accurately represents the noise present in the larger image of FIG. 3(a), according to one embodiment.

Blur

Blur in an image 116 occurs when a relative motion happens between an image acquisition device such as a camera and subject(s) of the image or when the subjects are out of focus. In different situations blur may appear over the whole image or just around some regions. Blur reduces image 116 sharpness. However, a naively reduced image may still look sharp, especially when blur in the corresponding parent image from which the naïve preview image is generated is not serious. Preview module 112 detects image blur for presentation in a perceptual preview image 114. This is accomplished by evaluating blur degree locally in the original image 116. In view of the evaluation, preview module 112 blurs a corresponding region in the perceptual preview image 114 to present a corresponding amount of blur. Edge region blur is generally more visible to a user when the whole image 116 is blurred. In view of this, when the whole image 116 is blurred, preview module 112 performs blur manipulation in the perceptual preview image 114 only along its edges.

Preview module 112 performs edge detection on a structurally enhanced perceptual preview image 114. For each edge pixel $E_i$ in the image, preview module 112 estimates its respective blur degree. Blur estimation is based on the observation that blurry edge regions usually have a smaller deviation among gradient angles than sharp edge regions do. More specially, for the edge pixel $E_i$, the region $R_i$ is located in the original image 116 that is shrunk to this pixel $E_i$. The gradient angles in the region $R_i$ are then denoted as $A_i(k)$. The amount of blurring $B_i$ at edge pixel $E_i$ is computed as follows:

$$\beta_i = \exp\{-\eta \cdot D(A_i)^\alpha\}, \qquad (3)$$

where $D(A_i)$ is the variance of the gradient angles in the region $R_i$. The parameters η and α control the estimated amount of blur. These are set empirically to η=3, and α=1.2. These parameters can also be determined subjectively.

Preview module 112 then synthesizes blur in the perceptual preview image 114 in the neighborhood of pixel $E_i$ according to the estimated amount of blur degree associated with the pixel. More particularly, preview module 112 implements blur operations using a Gaussian kernel according to the amount $B_i$ of blur, where $B_i$ is actually as the sigma of the Gaussian. The neighborhood of $E_i$ is then weighted using the Gaussian kernel.

An Exemplary Procedure

FIG. 4 shows an exemplary procedure 400 for perceptual image preview, according to one embodiment. For purposes of exemplary illustration and description, the operations of the procedure are described with respect to components of FIG. 1. At block 402, perceptual image preview module 112 (FIG. 1) generates a naïve preview image from a larger image 116 by downsampling the larger image 116. At block 404, perceptual image preview module 112 detects edge information from the naïve preview image. At block 406, perceptual image preview module 112 utilizes the detected edge information to enhance structure of the naïve preview image, and thereby creates a perceptual preview image 114 with enhanced structure (a structurally enhanced perceptual preview image). At block 408, perceptual image preview module 112 detects perceptual features (detected perceptual features 120 of FIG. 1) from the larger image 116.

At block 410, perceptual image preview module 112 incorporates information associated with at least a subset of the detected perceptual features 120 into a preview image to create a perceptual preview image 114. The particular preview image into which such information is incorporated can either be a naïve preview image or a structurally enhanced perceptual preview image 114. At block 412, perceptual image preview module 112 or a different application that leverages output of the perceptual image preview module 112, presents the perceptual preview image 114 to a user to represent the larger image 116 from which the perceptual preview image 114 was derived. Since the perceptual preview image 114 presents information associated with detected perceptual features of the larger image 116, viewing the perceptual preview image 114 allows a user to make educated determinations as to the quality or other aspects of the larger image 116.

CONCLUSION

Although the systems and methods for perceptual image preview have been described in language specific to structural features and/or methodological operations or actions, it is understood that the implementations defined in the appended claims are not necessarily limited to the specific features or actions described. For example, information associated with detected perceptual features 120 that have been incorporated into a perceptual preview image 114 can be used to allow a user to assess aspects of the larger image in addition to image quality (e.g., depth of field, etc.). Accordingly, the specific features and operations of system 100 are disclosed as exemplary forms of implementing the claimed subject matter.

The invention claimed is:

1. A computer-implemented method, comprising:
    under control of one or more computer devices configured with executable instructions,
        generating a naïve preview image by downsampling a larger image;
        detecting perceptual features associated with the larger image; the perceptual features comprise one or more of noise; blur, white balance blooming, image compression artifacts, and depth of field; and
        incorporating information associated with at least a subset of the perceptual features into the naïve preview image to create a perceptual preview image,
        wherein presentation of the perceptual preview image to a user facilitates a determination of presence or absence of the at least a subset of the perceptual features in the larger image.

2. The computer-implemented method of claim 1, wherein the perceptual features comprise noise or blur.

3. The computer-implemented method of claim 1, wherein the perceptual features relate to image quality.

4. The computer-implemented method of claim 1, wherein the information is based on the perceptual features and not extracted from the larger image, the information notifying a viewer of the perceptual preview image that at least a subset of the detected perceptual features exist in the larger image.

5. The computer-implemented method of claim 1, wherein incorporating the information further comprises structurally enhancing the naïve preview image to strengthen salient edges and flatten weak details.

6. The computer-implemented method of claim 5, wherein structurally enhancing is performed using non-linear modulation and a gradient domain of the larger image.

7. The computer-implemented method of claim 1, wherein detecting the perceptual features further comprises:
    detecting noise from a region of the larger image or the naïve preview image that includes relatively few salient edges, the region not representing an entirety of the larger image or the naïve preview of edge; and
    adding information synthesized from the noise to the perceptual preview image.

8. The computer-implemented method of claim 1 wherein detecting the perceptual features further comprises:
    evaluating respective blur degrees of each pixel of multiple pixels in at least a portion of the larger image; and
    synthesizing, for each pixel of the multiple pixels, blur in the perceptual preview image in an area of the perceptual preview image that corresponds to location of the pixel in the larger image.

9. The computer-implemented method of claim 1, wherein the perceptual features comprise one or more of noise, white balance, blooming, image compression artifacts, and depth of field.

10. A computer-readable medium comprising computer-program instructions executable by a processor for:
    generating a naïve preview image from a larger image;
    detecting perceptual features associated with the larger image, the perceptual features comprise one or more of noise, blur, white balance, blooming, image compression artifacts, and depth of field; and
    incorporating information associated with at least a subset of the perceptual features into the naïve preview image to create a perceptual preview image,
    wherein the information is not extracted from the larger image, the information notifying a viewer of the perceptual preview image that the at least a subset of the detected perceptual features exist to a represented degree in the larger image.

11. The computer-readable medium of claim 10, wherein the perceptual features relate to image quality.

12. The computer-readable medium of claim 11, wherein structurally enhancing is performed using non-linear modulation and a gradient domain of the naïve preview image.

13. The computer-readable medium of claim 10, wherein the computer-program instructions for incorporating the information further comprise instructions for structurally enhancing the naïve preview image to strengthen salient edges and flatten weak details.

14. The computer-readable medium of claim 10, wherein the computer-program instructions for detecting the perceptual features further comprise instructions for:
    detecting noise from a region of the larger image or the naïve preview image that includes relatively few salient edges, the region not representing an entirety of the larger image or the naïve preview of edge; and
    adding information synthesized from the noise to the perceptual preview image.

15. The computer-readable medium of claim 10, wherein the computer-program instructions for detecting the perceptual features further comprise instructions for:
    evaluating respective blur degrees of each pixel of multiple pixels in at least a portion of the larger image; and
    synthesizing, for each pixel of the multiple pixels, blur in the perceptual preview image in an area of the perceptual preview image that corresponds to location of the pixel in the larger image.

16. The computer-readable medium of claim 10, wherein the perceptual features comprise at least one of noise, blooming, and depth of field.

17. A computing device comprising:
    a processor; and
    a memory couple to the processor, the memory comprising computer-program instructions executable by the processor for:
        generating a naïve preview image from a larger image;
        evaluating the naïve preview image to identify edges;
        strengthening salient edges of the naïve preview image in view of the edges and flattening weak details of the naïve preview image in view of the edges to create a perceptual preview image;
detecting perceptual features of the larger image by performing operations of:
evaluating respective blur degrees of each pixel of multiple pixels in at least a portion of the larger image;
synthesizing, for each pixel of the multiple pixels, blur in the perceptual preview image in an area of the perceptual preview image that corresponds to location of the pixel in the larger image; and
calculating an amount of blurring $B_i$ at an edge pixel $E_i$ of the multiple pixels as an exponential function of a variance $D(A_i)$ of gradient angles in a region $R_i$;
incorporating information associated with at least a subset of the perceptual features into the perceptual preview image; and
presenting the perceptual preview image to a user to notify the user that the at least a subset of the detected perceptual features exist in the larger image.

18. The computing device of claim 17, wherein the perceptual features comprise one or more of structure, noise, blur, white balance, blooming, image compression artifacts, and depth of field.

19. The computing device of claim 17, wherein strengthening and flattening is performed using non-linear modulation and a gradient domain of the naïve preview image or the larger image.

20. The computing device of claim 17, wherein the computer-program instructions for detecting the perceptual features further comprise instructions for:
detecting noise from a region of the larger image or the naïve preview image that includes relatively few salient edges, the region not representing an entirety of the larger image or the naïve preview of edge; and
adding information synthesized from the noise to the perceptual preview image.

* * * * *

UNITED STATES PATENT AND TRADEMARK OFFICE
CERTIFICATE OF CORRECTION

Page 1 of 3

| | |
|---|---|
| PATENT NO. | : 7,715,657 B2 |
| APPLICATION NO. | : 11/276196 |
| DATED | : May 11, 2010 |
| INVENTOR(S) | : Zhouchen Lin et al. |

It is certified that error appears in the above-identified patent and that said Letters Patent is hereby corrected as shown below:

Delete Title Page, and replace with new Title Page. (Attached)

In Drawings, in Sheet 4 of 4, Fig. 4, line 1, above "402 and 408" insert -- 400 --. (Attached)

In column 7, line 34, in Claim 1, delete "image;" and insert -- image, --, therefor.

In column 7, line 35, in Claim 1, delete "noise;" and insert -- noise, --, therefor.

In column 7, line 35, in Claim 1, delete "balance" and insert -- balance, --, therefor.

In column 8, line 1, in Claim 8, delete "1" and insert -- 1, --, therefor.

Signed and Sealed this

Fifteenth Day of February, 2011

David J. Kappos
*Director of the United States Patent and Trademark Office*

(12) United States Patent
Lin et al.

(10) Patent No.: US 7,715,657 B2
(45) Date of Patent: May 11, 2010

(54) METHOD, DEVICE AND PROGRAM FOR DETECTING PERCEPTUAL FEATURES OF A LARGER IMAGE AND INCORPORATING INFORMATION OF THE DETECTED PERCEPTUAL FEATURES INTO A SMALLER PREVIEW IMAGE

(75) Inventors: Zhouchen Lin, Beijing (CN); Liang Wan, Hong Kong (CN); Wei Feng, Hong Kong (CN); Tien-Tsin Wong, Hong Kong (CN); Zhi-Qiang Liu, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 11/276,196

(22) Filed: Feb. 17, 2006

(65) Prior Publication Data
US 2007/0196027 A1 Aug. 23, 2007

(51) Int. Cl.
G06K 9/32 (2006.01)
G06K 9/36 (2006.01)
G06K 9/40 (2006.01)
G06F 3/048 (2006.01)

(52) U.S. Cl. .......... 382/298; 382/100; 382/254; 382/261; 382/276; 715/838

(58) Field of Classification Search .......... 382/261, 382/100, 254, 276, 298, 299, 301; 715/273, 715/835, 838
See application file for complete search history.

(56) References Cited

U.S. PATENT DOCUMENTS 5,641,596 A * 6/1997 Gray et al. ............ 430/21
6,181,834 B1 * 1/2001 Li et al. ............ 382/298
6,404,901 B1 * 6/2002 Itokawa ............ 382/103
6,548,800 B2 * 4/2003 Chen et al. ............ 250/208.1
2003/0026495 A1 * 2/2003 Gondek et al. ............ 382/261
2004/0205629 A1 * 10/2004 Rosenholtz et al. ............ 715/526

FOREIGN PATENT DOCUMENTS

WO WO02/07013 A2 1/2002

OTHER PUBLICATIONS

Chmielewski, et al., "A Distributed Platform from Archiving and Retrieving RSS Feeds", IEEE, 2005, Proc 4th Annual ACIS Intl Conf on Computer and Information Science, 6 pgs.
PCT Written Opinion of the Intl Searching Authority for Application No. PCT/US2007/004834, dated Aug. 7, 2007, 6 pgs.
Sutter, et al., "Enchancing RSS Feeds: Eliminating Overhead Through Binary Encoding", IEEE, 2005, Proc 3rd Intl Conf on Information Technology and Applications, 6 pgs.

* cited by examiner

Primary Examiner—Tom Y Lu
Assistant Examiner—Thomas A Conway
(74) Attorney, Agent, or Firm—Lee & Hayes, PLLC (57) ABSTRACT

Systems and methods for perceptual image preview are described. In one aspect, a naïve preview image is generated by downsampling a larger image. Perceptual features of the larger image are then detected. Information associated with the detected perceptual features is then incorporated into the naïve preview image to create a perceptual preview image. Since the perceptual preview image incorporates information associated with the detected perceptual features, a viewer of the perceptual preview image will be more likely to detect the presence or absence of such perceptual features in the larger image.

20 Claims, 4 Drawing Sheets